United States Patent
Park et al.

(10) Patent No.: US 9,902,360 B2
(45) Date of Patent: Feb. 27, 2018

(54) CUSHION FOR DRIVER AIRBAG APPARATUS

(71) Applicant: HYUNDAI MOBIS CO., LTD., Seoul (KR)

(72) Inventors: Hae Kwon Park, Yongin-si (KR); Ga Ram Jeong, Yongin-si (KR); Ji Woon Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/211,882

(22) Filed: Jul. 15, 2016

(65) Prior Publication Data

US 2017/0028957 A1 Feb. 2, 2017

(30) Foreign Application Priority Data

Jul. 29, 2015 (KR) .................. 10-2015-0107446

(51) Int. Cl.
*B60R 21/203* (2006.01)
*B60R 21/233* (2006.01)
*B60R 21/2338* (2011.01)

(52) U.S. Cl.
CPC ........ *B60R 21/2035* (2013.01); *B60R 21/203* (2013.01); *B60R 21/233* (2013.01); *B60R 21/2338* (2013.01); *B60R 2021/23324* (2013.01); *B60R 2021/23382* (2013.01)

(58) Field of Classification Search
CPC .............. B60R 21/2035; B60R 21/203; B60R 21/2338; B60R 21/233; B60R 2021/23382; B60R 2021/23324
See application file for complete search history.

(56) References Cited

U.S. PATENT DOCUMENTS

| 5,253,892 A * | 10/1993 | Satoh | B60R 21/233 280/731 |
| 6,059,312 A * | 5/2000 | Staub | B60R 21/233 280/729 |
| 6,086,092 A * | 7/2000 | Hill | B60R 21/233 280/729 |
| 6,832,778 B2 * | 12/2004 | Pinsenschaum | B60R 21/233 280/739 |
| 7,857,347 B2 * | 12/2010 | Abe | B60R 21/2338 280/729 |

(Continued)

FOREIGN PATENT DOCUMENTS

KR 10-2007-0042262 A 4/2007

*Primary Examiner* — Drew J Brown
(74) *Attorney, Agent, or Firm* — Knobbe Martens Olson & Bear LLP

(57) ABSTRACT

A cushion for a driver airbag apparatus may include: a cushion body deployed between a steering wheel and a driver, and including a front chamber contacted with the steering wheel and a rear chamber coming in contact with the driver; a middle panel installed in the cushion body so as to divide the front chamber and the rear chamber, and having an inner vent hole through which gas is introduced from the front chamber to the rear chamber; and an internal tether arranged in the front chamber, and restricting the backward movement of the middle panel such that the middle panel forms a concave shape in the forward direction when the cushion is deployed.

7 Claims, 4 Drawing Sheets

(56) References Cited

U.S. PATENT DOCUMENTS

| | | | |
|---|---|---|---|
| 2004/0145162 A1* | 7/2004 | Abe | B60R 21/233 |
| | | | 280/729 |
| 2006/0175819 A1* | 8/2006 | Abe | B60R 21/231 |
| | | | 280/743.2 |
| 2006/0249939 A1* | 11/2006 | Maripudi | B60R 21/2346 |
| | | | 280/740 |
| 2007/0024043 A1* | 2/2007 | Abe | B60R 21/233 |
| | | | 280/743.2 |
| 2013/0313809 A1* | 11/2013 | Yamaji | B60R 21/203 |
| | | | 280/729 |

* cited by examiner

CUSHION FOR DRIVER AIRBAG APPARATUS

CROSS-REFERENCES TO RELATED APPLICATIONS

The present application claims priority to Korean application number 10-2015-0107446, filed on Jul. 29, 2015, which is incorporated by reference in its entirety.

BACKGROUND

The present disclosure relates to a cushion for a driver airbag apparatus, and more particularly, to a cushion for a driver airbag apparatus, which is capable of preventing an injury of a driver.

In general, a driver airbag of a vehicle is a device which can momentarily inflate an air cushion between a driver and a steering wheel when a vehicle crashes, thereby reducing an injury caused by a shock. The driver airbag includes an inflator which generates gas and a cushion which is expanded and deployed toward a driver seat by the generated gas.

The related technology is disclosed in Korean Patent Publication No. 2007-0042262 published on Apr. 23, 2007 and entitled "Structure of driver airbag cushion".

SUMMARY

Embodiments of the present invention are directed to a cushion for a driver airbag apparatus, which is capable of stably reducing an injury in neck of a driver when an AEB (Autonomous Emergency Braking) system is operated.

In one embodiment, a cushion for a driver airbag apparatus may include: a cushion body deployed between a steering wheel and a driver, and including a front chamber contacted with the steering wheel and a rear chamber coming in contact with the driver; a middle panel installed in the cushion body so as to divide the front chamber and the rear chamber, and having an inner vent hole through which gas is introduced from the front chamber to the rear chamber; and an internal tether arranged in the front chamber, and restricting the backward movement of the middle panel such that the middle panel forms a concave shape in the forward direction when the cushion is deployed.

The cushion body may include: a front panel contacted with the steering wheel, and having an outer vent hole through which gas in the front chamber is discharged to the outside; and a rear panel arranged at the rear of the front panel, and facing the driver.

The middle panel may be arranged between the front panel and the rear panel.

The edge portions of the front panel, the middle panel and the rear panel may be connected to each other in a state where the front panel, the middle panel and the rear panel are sequentially overlapped.

The front chamber may include: a gas buffering chamber to which gas is introduced from an inflator; and a flow stabilization chamber to which the gas in the gas buffering chamber is distributed and introduced.

The cushion body may include a deployment pressure distribution panel installed in the front chamber so as to divide the gas buffering chamber and the flow stabilization chamber.

The deployment pressure distribution panel may have a plurality of distribution holes formed therein, and the gas in the gas buffering chamber may be introduced into the flow stabilization chamber through the distribution holes.

The internal tether may include: an extension portion arranged in the front chamber, and extended in the forward and backward direction; a front connection portion formed at the front of the extension portion, and coupled to the cushion body; and a rear connection portion formed at the rear of the extension portion, and coupled to the middle panel.

The extension portion may have an adjustable length.

The internal tether may be positioned at the middle portion of the front chamber, and the inner vent hole may be formed at both sides of the front chamber with the internal tether interposed therebetween.

When gas is supplied to the cushion body from an inflator, the front chamber and the rear chamber may be sequentially deployed.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Generally, when a shock is sensed by a shock sensor in case where a vehicle crashes, an electronic control module operates the inflator to rapidly generate gas, and the cushion is deployed toward the driver by the generated gas. The deployed cushion partially absorbs a shock load caused by the crash while coming in contact with the upper body of the driver. Then, when the upper body of the driver collides with the expanded cushion, the gas in the cushion serves as a buffer while being rapidly discharged through a discharge hole formed in the cushion.

The driver airbag is designed to come in contact with the driver's head which is tilted forward in a state where the cushion is completely deployed, when the vehicle crashes. However, when the vehicle is suddenly braked through an AEB (Autonomous Emergency Braking) operation, the head of the driver may be more rapidly tilted forward, and thus come in contact with the cushion before the cushion is completely deployed. Then, the head of the driver may be tilted backward while the airbag cushion is successively expanded. In this case, the driver may get injured in the neck. Thus, there is a demand for a structure capable of solving such a problem.

Figure 1:
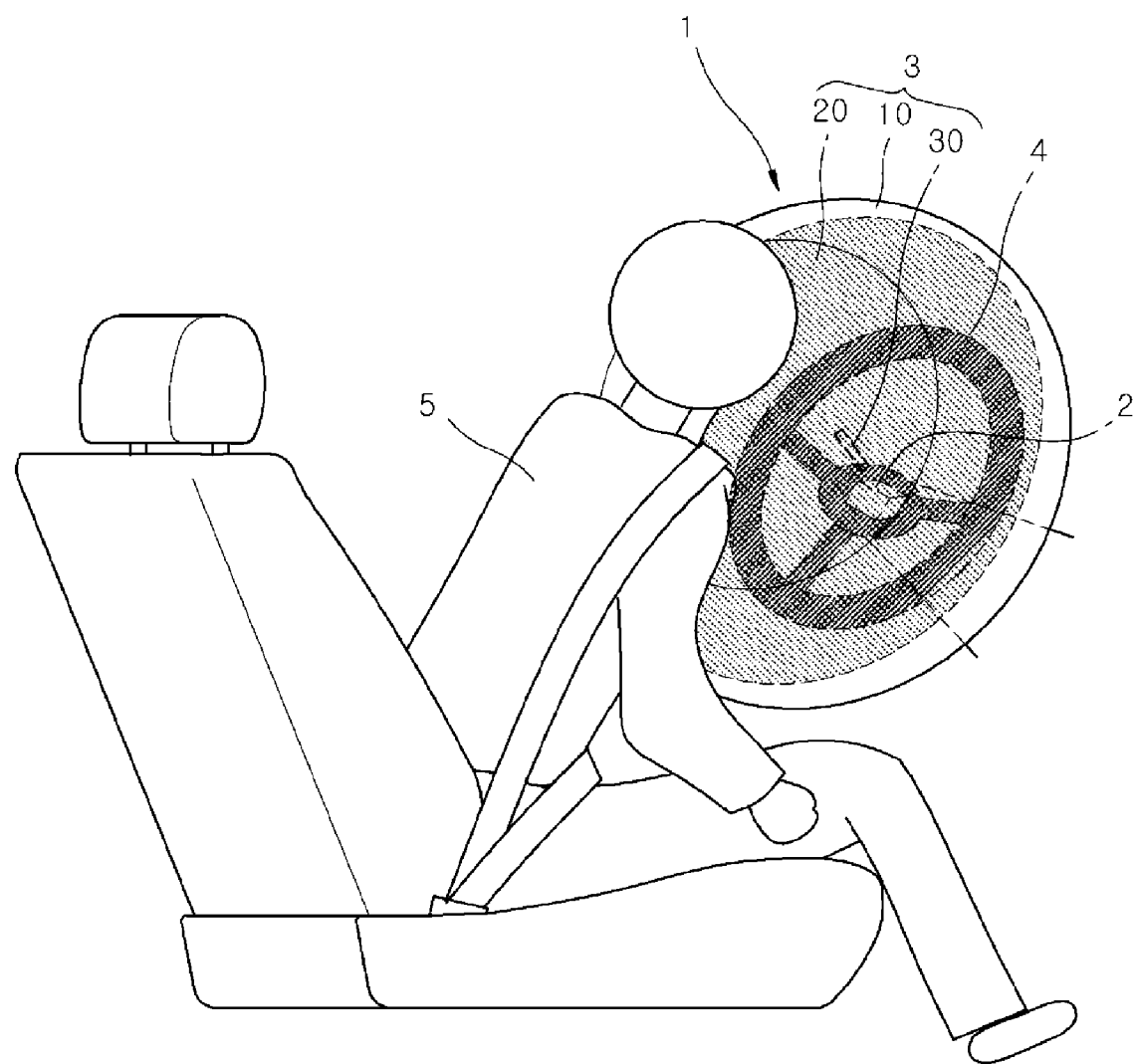
FIG. 1 is a perspective view schematically illustrating the installation position and deployment shape of a cushion for a driver airbag apparatus in accordance with an embodiment of the present invention.
Figure 2:
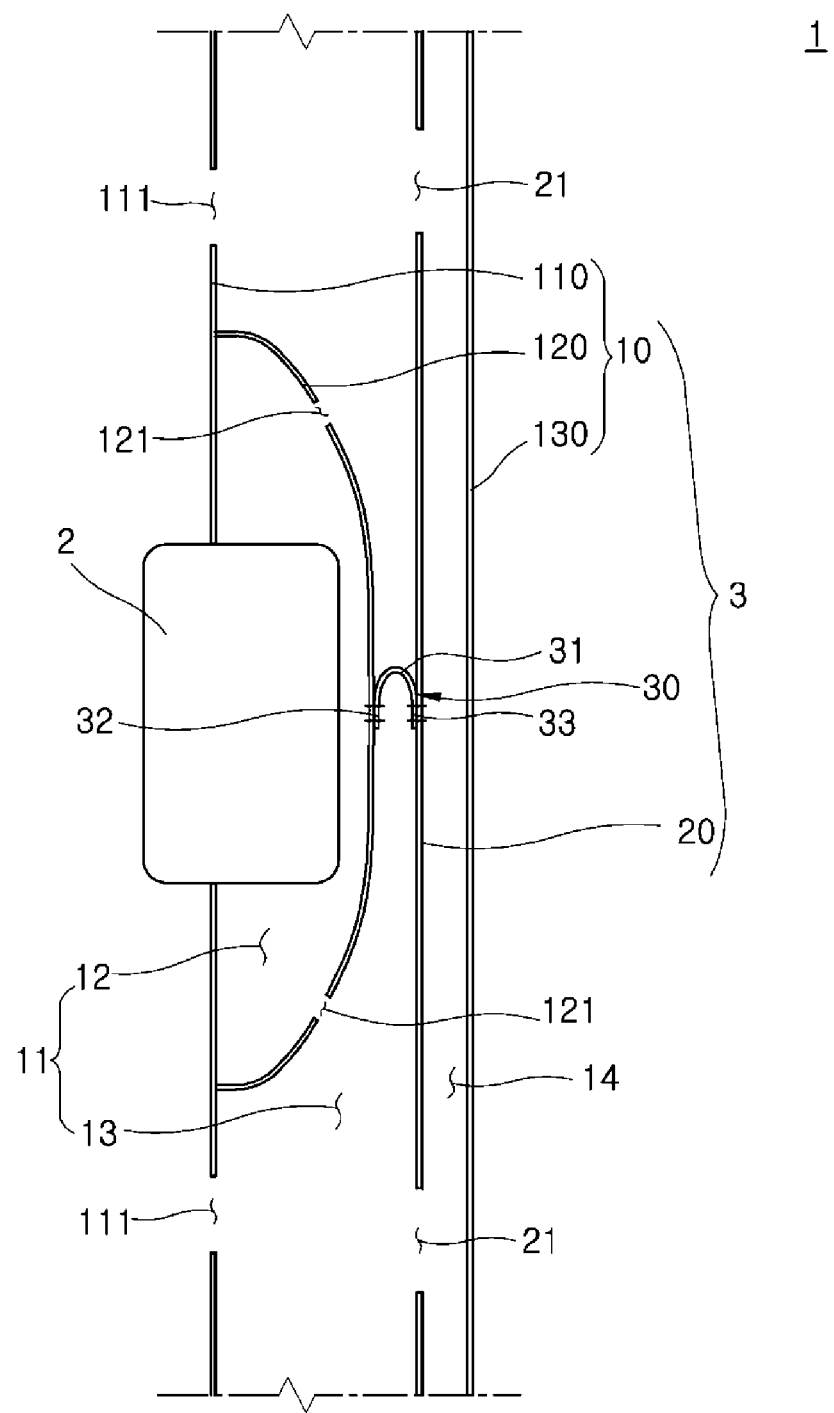
FIG. 2 is a longitudinal sectional view schematically illustrating the shape of the cushion for a driver airbag apparatus in accordance with the embodiment of the present invention, before the cushion is deployed.

FIG. 1 is a perspective view schematically illustrating the installation position and deployment shape of a cushion for a driver airbag apparatus in accordance with an embodiment of the present invention, and FIG. 2 is a longitudinal sectional view schematically illustrating the shape of the cushion for a driver airbag apparatus in accordance with the embodiment of the present invention, before the cushion is deployed.

Figure 3:
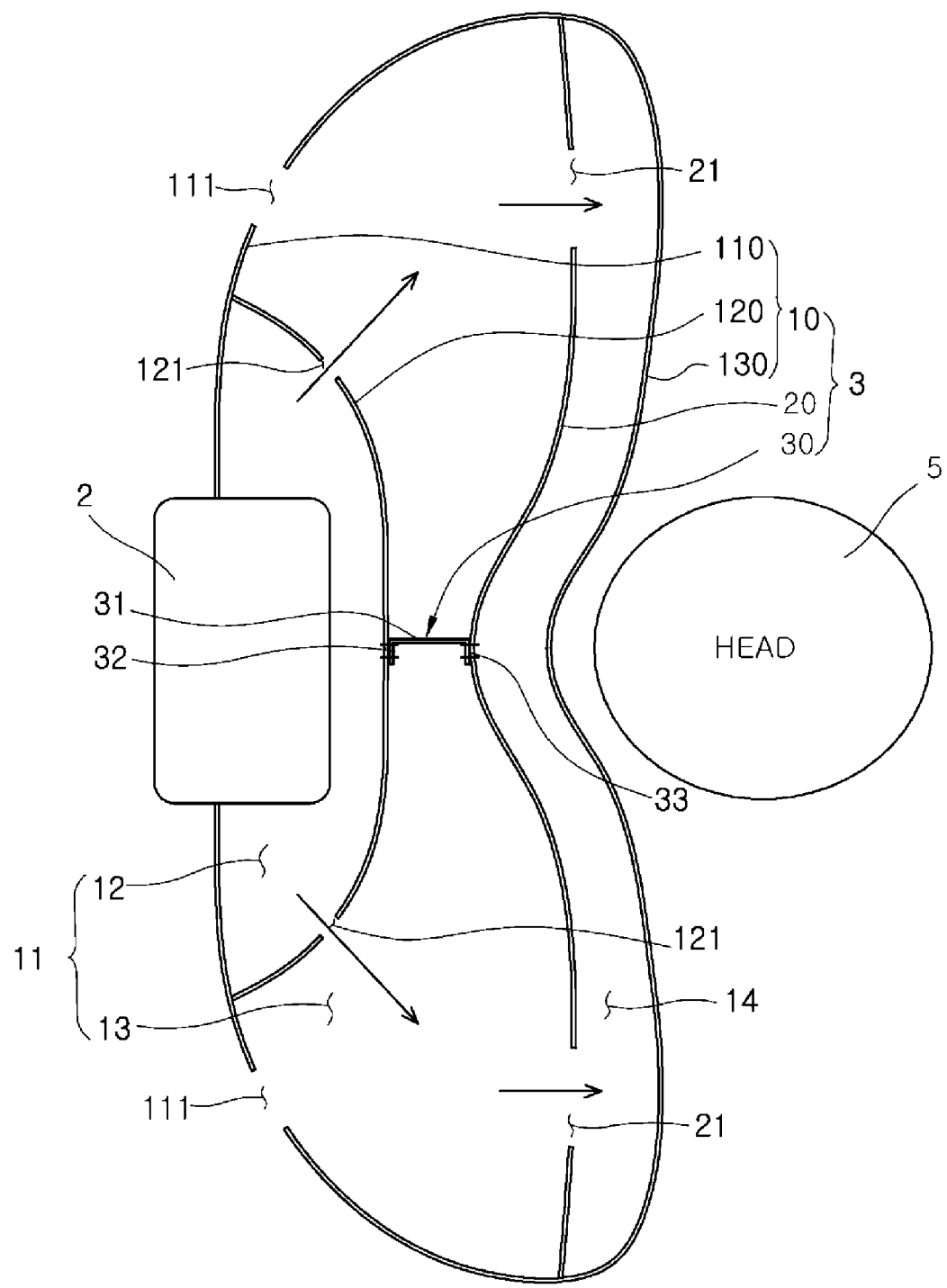
FIG. 3 is a longitudinal sectional view schematically illustrating the deployment shape of the cushion for a driver airbag apparatus in accordance with the embodiment of the present invention, when an AEB (Autonomous Emergency Braking) system is operated.
Figure 4:
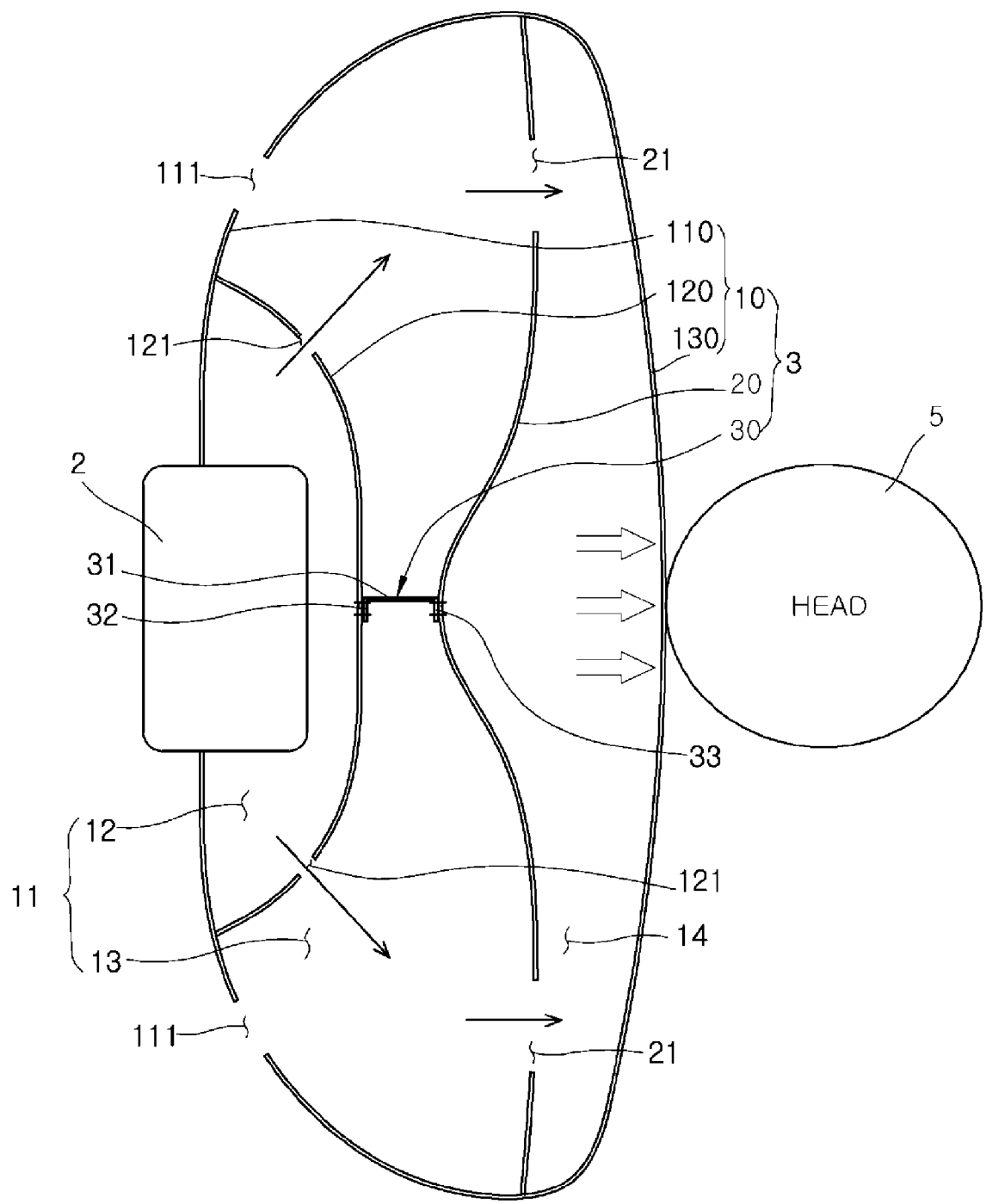
FIG. 4 is a longitudinal sectional view schematically illustrating the deployment shape of the cushion for a driver airbag apparatus in accordance with the embodiment of the present invention, when a general vehicle crash occurs.

FIG. 3 is a longitudinal sectional view schematically illustrating the deployment shape of the cushion for a driver airbag apparatus in accordance with the embodiment of the present invention, when an AEB (Autonomous Emergency Braking) system is operated, and FIG. 4 is a longitudinal sectional view schematically illustrating the deployment shape of the cushion for a driver airbag apparatus in accordance with the embodiment of the present invention, when a general vehicle crash occurs.

Referring to FIG. 1, a driver airbag apparatus 1 to which the cushion 3 for a driver airbag apparatus in accordance with the present embodiment is applied may be installed in a steering wheel 4 positioned in front of a driver 5. When the vehicle crashes or the AEB system is operated, an inflator 2 coupled to the steering wheel 4 may be operated, and the cushion 3 for the driver airbag apparatus 1 in accordance with the present embodiment may be deployed backward toward the driver 5 and support the upper body of the driver 5, which is tilted forward.

Referring to FIG. 2, the cushion 3 for the driver airbag apparatus in accordance with the embodiment of the present invention may include a cushion body 10, a middle panel 20 and an internal tether 30.

The cushion body 10 may receive gas from the inflator 2 when the vehicle crashes, and form an air cushion which buffers a shock while being inflated. The cushion body 10 in accordance with the present embodiment may include a front chamber 11 and a rear chamber 14 which are arranged in the forward and backward direction. The cushion body 10 may be deployed between the steering wheel 4 and the upper body of the driver 5.

The middle panel 20 may be installed in the cushion body 10 so as to divide the front chamber 11 and the rear chamber 14. The front chamber 11 and the rear chamber 14 may be divided by the middle panel 20, and sequentially deployed in order of the front chamber 11 and the rear chamber 14. The middle panel 20 may have an inner vent hole 21 formed therein, the inner vent hole 21 forming a path through which gas of the front chamber 11 can be introduced into the rear chamber 14.

The internal tether 30 may serve to restrict the middle panel 20 from moving backward, such that the middle panel 20 forms a concave shape in the forward direction when the cushion body 10 is deployed. The internal tether 30 may be arranged in the front chamber 11, and installed across the front chamber 11 in the forward and backward direction. The internal tether 30 may be installed at the middle portion of the front chamber 11 or particularly a position corresponding to the head of the driver 5.

When the cushion body 10 is deployed, the internal tether 30 may restrict the middle portion of the middle panel 20 from freely moving backward, and the middle portion of the middle panel 20 may be positioned further forward than both side portions or edge of the middle panel 20. Thus, as illustrated in FIGS. 3 and 4, the middle portion of the middle panel 20 may form a concave shape in the forward direction.

As described above, the middle panel 20 may form a concave shape in the forward direction, when the front chamber 11 is deployed. After the front chamber 11 is deployed, the rear chamber 14 may be initially deployed in a shape corresponding to the concave shape of the middle panel 20 or a concave shape corresponding to the head of the driver 5. When the AEB system is operated, the head of the driver 5 may be more rapidly tilted forward than when a general vehicle crash occurs. At this time, the head of the driver 5 may face the rear chamber 14 forming a concave shape in the forward direction.

While the upper body of the driver 5 is rapidly tilted forward by the operation of the AEB system, the cushion body 10 may not be yet completely deployed. In embodiments, as illustrated in FIG. 3, a part of the rear chamber 14 may be deployed or the front chamber 11 may not be completely deployed. As the rear chamber 14 is induced to be initially deployed in a concave shape to the front, the head of the driver 5 can be prevented from coming in direct contact with the cushion body 10 when the AEB system is operated.

Thus, when the AEB system is operated, momentary pressure may be applied to the head of the driver 5 due to backslap of the cushion body 10, thereby preventing a break of the neck of the driver 5. Thus, it is possible to reduce the injury in neck of the driver 5, which may occur when the AEB system is operated.

When a general vehicle crash occurs, the upper body of the driver 5 may come in contact with the cushion body 10 in a state where the front chamber 11 and the rear chamber 14 are deployed as illustrated in FIG. 4. At this time, the middle portion of the rear chamber 14 may form a convex shape in the backward direction. When a general vehicle crash occurs, the upper body of the driver 5 may be loaded on the cushion body 10 while being tilted forward, and buffered and supported by the retention force and cushion force of the front and rear chambers 11 and 14.

Referring to FIG. 2, the cushion body 10 in accordance with the present embodiment may include a front panel 110, a deployment pressure distribution panel 120 and a rear panel 130.

The front panel 110 may form the front portion of the cushion body 10, facing the steering wheel 4. The rear panel 130 may form the rear portion of the cushion body 10, facing the driver 5. The rear panel 130 may be arranged at the rear of the front panel 110 with the middle panel 20 interposed therebetween. The edge portions of the front panel 110, the middle panel 20 and the rear panel 130 may be connected to each other through sewing in a state where the front panel 110, the middle panel 20 and the rear panel 130 are sequentially overlapped, thereby forming the front chamber 11 and the rear chamber 14.

When the cushion body 10 is deployed, the front chamber 11 and the rear chamber 14 may be arranged in the forward and backward direction while being inflated in a discus shape. The gas supplied from the inflator 2 may be introduced into the front chamber 11, and the front chamber 11 may be deployed prior to the rear chamber 14.

When the vehicle crashes or the AEB system is operated, the front chamber 11 may support a load applied to the rear chamber 14 at the front. The weight of the driver 5 may be primarily applied to the rear chamber 14, and the forward force applied to the rear chamber 14 may be secondarily applied to the front chamber 11. Such an action can more stably secure a cushion force for protecting the driver 5 from a shock force than when the cushion body 10 includes one chamber.

Referring to FIG. 2, the front chamber 11 in accordance with the present embodiment may include a gas buffering chamber 12 and a flow stabilization chamber 13. The gas buffering chamber 12 may form a space to which the gas discharged from the inflator 2 is primarily introduced. The flow stabilization chamber 13 may form a space to which the gas buffered in the gas buffering chamber 12 is distributed and introduced, while being in contact with the rear chamber 14.

Between the gas buffering chamber 12 and the flow stabilization chamber 13, the deployment pressure distribution panel 120 may be installed. The gas may be discharged in a specific direction from a specific position of the inflator 2. The gas which is non-uniformly introduced into the gas buffering chamber 12 may be diffused into the gas buffering chamber 12 while blocked and buffered by the deployment pressure distribution panel 120.

As such, the gas buffered and diffused in the gas buffering chamber 12 may be introduced to the flow stabilization chamber 13 through a plurality of distribution holes 121 formed in the deployment pressure distribution panel 120. Since the gas in the gas buffering chamber 12 is distributed through the plurality of distribution holes 121 and introduced into the flow stabilization chamber 13, the gas flow into the flow stabilization chamber 13 may not be concentrated on one side, but uniformly performed across the entire connection portion to the deployment pressure distribution panel 120.

The deployment pressure distribution panel 120 may be installed in the front chamber 11 so as to divide the gas buffering chamber 12 and the flow stabilization chamber 13. The plurality of distribution holes 121 formed through the deployment pressure distribution panel 120 may serve as paths through which the gas in the gas buffering chamber 12 is introduced into the flow stabilization chamber 13. The gas in the gas buffering chamber 12 may be uniformly distributed through the plurality of distribution holes 121 and introduced into the flow stabilization chamber 13.

The gas in the flow stabilization chamber 13 may flow to the rear chamber 14 through the inner vent hole 21 formed in the middle panel 20. The internal tether 30 in accordance with the present embodiment may be connected to the middle portion of the middle panel 20, and the plurality of inner vent holes 21 may be distributed and formed at both sides or edge of the front chamber 11 with the internal tether 30 interposed therebetween. The number and width of the inner vent holes 21 may be adjusted to control the deployment speed and contraction speed of the rear chamber 14.

Thus, the gas flow from the front chamber 11 to the rear chamber 14 may be preferentially performed at the edge portion of the middle panel 20 before the concave portion of the middle panel 20, and the edge portion of the rear chamber 14 may be preferentially deployed before the middle portion of the rear chamber 14. Thus, when the rear chamber 14 is initially deployed, the deployment shape of the rear chamber 14 may be stabilized to form a concave shape in the forward direction. Thus, the flow pressure of the gas introduced into the rear chamber 14 can be prevented from being directly applied to the head of the driver 5.

The front panel 110 may have outer vent holes 111 through which the gas in the cushion body 10 is discharged to the outside. When the upper body of the driver 5 is loaded on the cushion body 10, the gas in the front chamber 11 may serve as a buffer while being rapidly discharged through the outer vent holes 111. The number and width of the outer vent holes 111 may be adjusted to control the contraction speed of the cushion body 10. Furthermore, the outer vent holes 111 may be formed in the flow stabilization chamber 13 of the front panel 110, which makes it possible to prevent the gas in the cushion body 10 from being discharging toward the driver 5.

Referring to FIG. 2, the internal tether 30 in accordance with the present embodiment may include an extension portion 31, a front connection portion 32 and a rear connection portion 33.

The extension portion 31 may be formed in a string or panel shape to cross the front chamber 11 in the forward and backward direction. The front connection portion 32 for connecting the extension portion 31 to the cushion body 10 may be formed at the front of the extension portion 31 and coupled to the deployment pressure distribution panel 120. The rear connection portion 33 for connecting the extension portion 31 to the middle panel 20 may be formed at the rear of the extension portion 31 and coupled to the middle portion of the middle panel 20.

The length of the extension portion 31 may be adjusted to control the concaveness of the middle portion of the middle panel 20. The extension portion 31 may be extended to decrease the degree in concaveness of the middle panel 20, or shortened to increase the degree in concaveness of the middle panel 20. As the length of the internal tether 30 is adjusted to various values, the concaveness of the middle panel 20 may be suitably controlled according to the behavior of the driver 5, which is differently simulated depending on the vehicle model or specification.

In the cushion 3 for the driver airbag apparatus 1 in accordance with the present embodiment, the cushion body 10 deployed between the steering wheel 4 and the driver 5 may be divided into the front chamber 11 and the rear chamber 14, and the internal tether 30 which divides the front chamber 11 and the rear chamber 14 may restrict the backward motion of the middle portion of the middle panel 20. Thus, when the cushion 3 is deployed, the portion of the middle panel 20, corresponding to the head of the driver 5, may form a concave shape in the forward direction.

Therefore, when the front chamber 11 and the rear chamber 14 are sequentially deployed, the rear chamber 14 may be initially deployed in a concave shape corresponding to the middle panel 20. Thus, although the head of the driver 5 is rapidly tilted forward when the AEB system is operated, the cushion 3 for the driver airbag apparatus 1 can stably reduce an injury in neck of the driver 5, which may occur when the head of the driver 5 is tilted backward while coming in direct contact with the cushion body 10.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. An airbag apparatus, comprising:
   a front chamber;
   a rear chamber,
   a middle chamber interposed between the front chamber and the rear chamber;
   a deployment pressure distribution panel partitioning between the front chamber and the middle chamber, the deployment pressure distribution panel comprising at least one gas distribution hole configured to let gas flow therethrough from the front chamber to the middle chamber when an inflator generates gas;

a middle panel partitioning between the front chamber and the rear chamber, the middle panel comprising at least one inner vent hole configured to let gas flow therethrough from the middle chamber to the rear chamber; and an internal tether attached to a central portion of the deployment pressure distribution panel and also attached to a central portion of the middle panel such that deployment of the central portion of the middle panel is more limited by the internal tether than deployment of peripheral portions of the middle panel and further such that the middle panel is concaved in the central portion in a direction toward the front chamber when the airbag apparatus has deployed.

2. The airbag apparatus of claim 1, further comprising:
a front panel of the front chamber;
an outer vent hole configured to discharge gas therethrough from the front chamber to outside; and
a rear panel arranged at the rear of the front panel.

3. The airbag apparatus of claim 2, wherein an edge portion of the front panel, the middle panel and the rear panel are connected to each other in a state where the front panel, the middle panel and the rear panel are sequentially overlapped.

4. The airbag apparatus of claim 1, wherein the internal tether is positioned at the middle portion of the front chamber, and
the at least one inner vent hole is formed at both sides of the front chamber with the internal tether interposed therebetween.

5. The airbag apparatus of claim 1, wherein when the inflator generates gas, the front chamber and the rear chamber are sequentially deployed.

6. An airbag apparatus, comprising:
an inflator;
a front chamber configured to receive gas from the inflator;
a rear chamber configured to receive gas from the front chamber;
a middle panel partitioning between the front chamber and the rear chamber, and having at least one inner vent hole configured to introduce gas therethrough from the front chamber to the rear chamber; and
an internal tether arranged in the front chamber, and configured to restrict backward movement of the middle panel such that the middle panel forms a concave shape in a forward direction when airbag apparatus deploys,
wherein the front chamber comprises a gas buffering chamber configured to receive gas from the inflator, and a flow stabilization chamber configured to receive gas from the gas buffering chamber,
wherein the airbag apparatus further comprises a deployment pressure distribution panel installed in the front chamber and partitioning between the gas buffering chamber and the flow stabilization chamber.

7. The airbag apparatus of claim 6,
wherein the deployment pressure distribution panel has a plurality of distribution holes formed therein, and the plurality of distribution holes configured to introduce gas therethrough from the gas buffering chamber into the flow stabilization chamber.

* * * * *